US006862406B2

United States Patent
Franco Kai Chung (10) Patent No.: US 6,862,406 B2
(45) Date of Patent: Mar. 1, 2005

(54) LOYALTY CAMERA AND A SYSTEM AND METHOD FOR PROMOTING CONSUMER LOYALTY

(75) Inventor: Yik Franco Kai Chung, Tin Shui Wai (CN)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/613,181

(22) Filed: Jul. 3, 2003

(65) Prior Publication Data

US 2004/0028398 A1 Feb. 12, 2004

Related U.S. Application Data

(60) Provisional application No. 60/394,155, filed on Jul. 3, 2002.

(51) Int. Cl.[7] .............................................. G03B 17/02
(52) U.S. Cl. ............................ 396/6; 396/413; 396/536
(58) Field of Search ............................ 396/6, 411, 413, 396/536

(56) References Cited

U.S. PATENT DOCUMENTS 6,325,555 B1 * 12/2001 Zawodny et al. ........... 396/411
6,490,411 B1 * 12/2002 Mazzacani et al. ............ 396/6

* cited by examiner

Primary Examiner—David M. Gray
(74) Attorney, Agent, or Firm—Scott L. Lampert; Kerry Sisselman (57) ABSTRACT

A camera and method for promoting consumer loyalty for film developing services is provided. A loyalty camera is provided wherein a particular tool is required to rewind the exposed film and assist in manipulating the film door latch. In one embodiment, the tool is inserted into a combined film advance/rewind mechanism to move a lever arm against a portion of the anti-reversal pawl to bias the pawl out of contact with the film advance wheel and permit film rewinding. Additionally, in some embodiments the particular tool is additionally used to move the door lever to open the film door.

26 Claims, 9 Drawing Sheets

LOYALTY CAMERA AND A SYSTEM AND METHOD FOR PROMOTING CONSUMER LOYALTY

PRIORITY

The present application claims priority from co-pending provisional patent application Ser. No. 60/394,155, Filed on Jul. 3, 2002, and entitled LOYALTY CAMERA AND A SYSTEM AND METHOD FOR PROMOTING CONSUMER LOYALTY.

FIELD OF THE INVENTION

The present invention relates to the field of cameras and, more particularly, to a camera which promotes consumer loyalty in the choice of film developing services.

BACKGROUND OF THE INVENTION

Many systems have been developed for encouraging consumers to return to a particular establishment for film developing services. In the past, such loyalty programs have provided free film replacement in exchange for developing the film in a certain establishment. The free film was then loaded by the user into the user's own camera of choice.

Other loyalty programs have involved cameras specifically dedicated to a specific loyalty program or rental service.

The Forever Camera Co. of Boca Raton, Fla. announced a reloadable, reusable 35 mm camera that comes pre-loaded with film and a battery. When a customer purchases the camera from a "forever camera" retailer, the purchaser automatically becomes a member of the Forever Camera Club. As a member, the customer qualifies for free film and batteries whenever they bring the camera back to the lab with film for processing. Although offering an incentive to the consumer to return to a Forever Camera Club location for developing, the Forever Camera does not discourage in any way reloading of the film by the consumer, or the taking of the film to another retailer for developing. The Forever Camera is nothing more than a regularly configured 35 mm camera.

U.S. Pat. No. 5,708,856 to Cloutier and No. 5,752,085 to Cloutier et al. and assigned to Eastman Kodak Company, relate to a rental camera with a locking device to deter customer reuse after completed exposure. The '085 Cloutier et al. patent discloses a rental camera including a locking device with a key and keyhole arrangement. The Cloutier '856 patent includes a locking screw arrangement. Both Cloutier patents disclose rental cameras which are to be used by a customer for picture-taking and returned to a lender to unlock the film door and unload exposed film and replace with fresh film. A motor within the cameras of the '085 and '856 patents is used to rewind the exposed film into a cartridge.

Two loyalty cameras and systems having the film pre-wound in the camera under non-darkroom conditions have been offered by the present assignee. In the first loyalty camera system a camera was sold requiring a special key or tool to open the film door and remove the film cartridge. The camera containing the exposed film must be returned to the retailer of purchase, who exclusively has the special key tool used to open the film door and remove the film cartridge. Additionally, in that system, the special key tool is further required in combination with a mechanism located adjacent the film spool to pre-wind the unexposed 35 mm film into a roll for use before the camera is returned to the consumer. The consumer than advances the film back into the film cassette after each exposure.

In the second loyalty camera system of the present assignee, the loyalty camera was sold having a sticker loosely adhered over the traditional style door latch to discourage the user from opening the camera. The packaging and marketing materials encourage the consumer to return the camera containing the exposed film to an affiliated retailer for removal and free replacement of the film. In that particular loyalty system, fresh film is pre-wound in the camera in non-darkroom conditions using a crank located adjacent the film spool and accessible through the outside cover of the camera.

The present assignee has additionally sold a locking loyalty camera including a motor for use in a loyalty camera system. The locking mechanism of that loyalty camera is disclosed in allowed U.S. patent application Ser. No. 09/528,939, that patent application being incorporated herein by reference.

What is needed is an inexpensive loyalty camera and system wherein a particular mechanism is used by a camera store affiliate to rewind and remove exposed film from the loyalty camera. What is additionally needed is a loyalty camera wherein the particular mechanism for rewinding is, in part, combined with the film advance mechanism. What is further needed is an inexpensive camera for promoting user loyalty. These objects, as well as others, are satisfied by the present inventions.

SUMMARY OF THE INVENTION

A loyalty camera is provided wherein a tool is required to rewind the exposed film and to assist in manipulating the film door latch. In one embodiment, the tool is used to manipulate a combined film advance/rewind mechanism to rewind the film. The tool is used to bias a lever arm against a portion of the anti-reversal pawl to bias the pawl out of contact with the film advance mechanism and permit film rewinding.

Additionally, in some embodiments the particular tool is additionally used to move the door lever to open the film door.

Other objects and advantages of the present invention will become more readily apparent in the description that follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

Referring to FIGS. 1–11, the present invention is directed towards a new and improved loyalty camera 10 having means for restricting rewinding of the exposed film and for limiting removal and replacement of the film cartridge to those in possession of the particular tool used for these purposes. The camera 10 may be a reusable camera of the type described in U.S. Pat. No. 6,331,082, that patent incorporated herein by reference, but having a modified combined advance/rewind mechanism in place of the combined advance/rewind mechanism described in the '082 patent, as will be described below. Additionally, the camera may accept APS film, 35 mm film, or other film sizes.

The camera 10 has a main body 12 with a taking lens 20, a film cartridge receiving compartment 14 disposed on one side of the taking lens 20 and a take-up spool (not shown) disposed on the opposite side of the taking lens 20, whereby the camera is structured for rewinding of exposed film into a film cartridge seated in the film cartridge receiving compartment from the take-up spool.

The camera 10 includes a film door 16 structured to mate with a latching member 18 on the main body 12 and provide access to the film cartridge receiving compartment 16 a battery compartment is accessible via a battery compartment door disposed beneath the main body 12. Front cover 13 and rear cover 15 are structured to mate with the main body 12 and film door 16 to form a light-tight casing.

A locking mechanism comprises the latching member 18 and the door lever 30. Latching member 18 is structured to matingly engage a hook 16a extending perpendicularly upward from the film door 16 when the latching member 18 is in a first locking position. The latching member 18 may be the same as and may operate the same as actuator 324 described in connection with FIGS. 17F–17H of the previously incorporated '082 patent.

Door lever 30 is coupled to the latching member 18 through the camera housing 13 and 15 and secured to the camera body 12 by a screw 32. The outer face 30a of the door lever 30 in the present embodiment is designed to be substantially flat to prevent the fingers of a user from gaining purchase on the latch and opening the camera without the tool, prior to the exposed film being rewound. The door lever 30 includes a first hole 30b and a hole or indentations 30c. The screw 32 passes through the first hole 30b and secures the door lever 30 pivotally to the camera body 12. Both holes 30b and 30c are adapted to matingly engage an external tool 40 which is used to pivot the door lever 30 into the unlocked position. As described in the previously incorporated '082 patent, pivoting the door lever 30 into the unlocked position releases the hook 16a from the latching member 18, thereby permitting the film door 16 to be opened.

An external tool 40, having a pair of pins 42a and 42b are sized to engage holes 30b and 30c, respectively and to permit the door lever 30 to pivot from the locked to the unlocked position (as shown more particularly in connection with FIGS. 4 and 5) in order to release the film door 16. Indicia may be provided on the top face of the tool 40 to instruct the user of its proper usage to open the film door 16.

The tool 40 also includes a generally circular-shaped area 44, having at least one outwardly extending prong 46, extending out from its bottom face 48. In the preferred embodiment, four pins 46 extend perpendicularly from the bottom face 48. Note however that the number of pins 46 used is merely a design choice based upon the length of the circumferential portion 80a of the lever arm (80 of FIG. 11).

Figure 1:
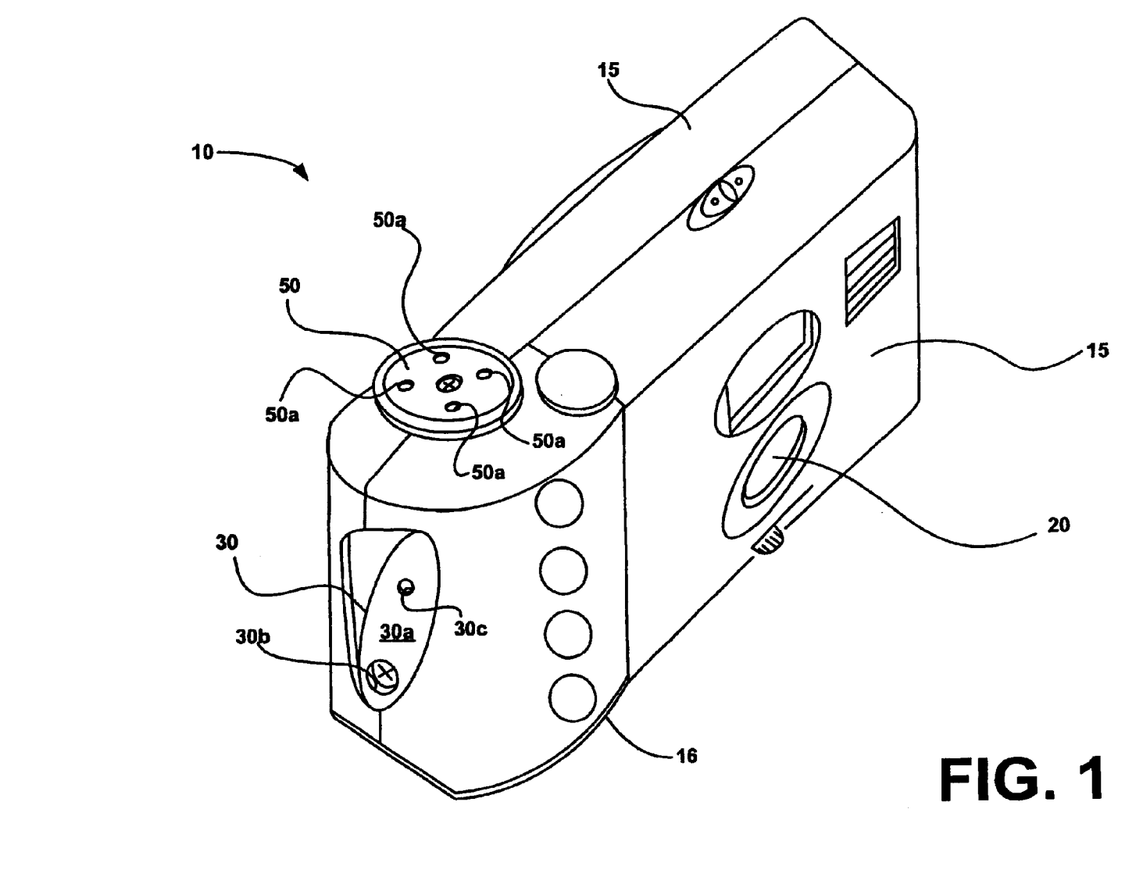
FIG. 1 is a front perspective view of a loyalty camera in accordance with one embodiment of the present invention.
Figure 2:
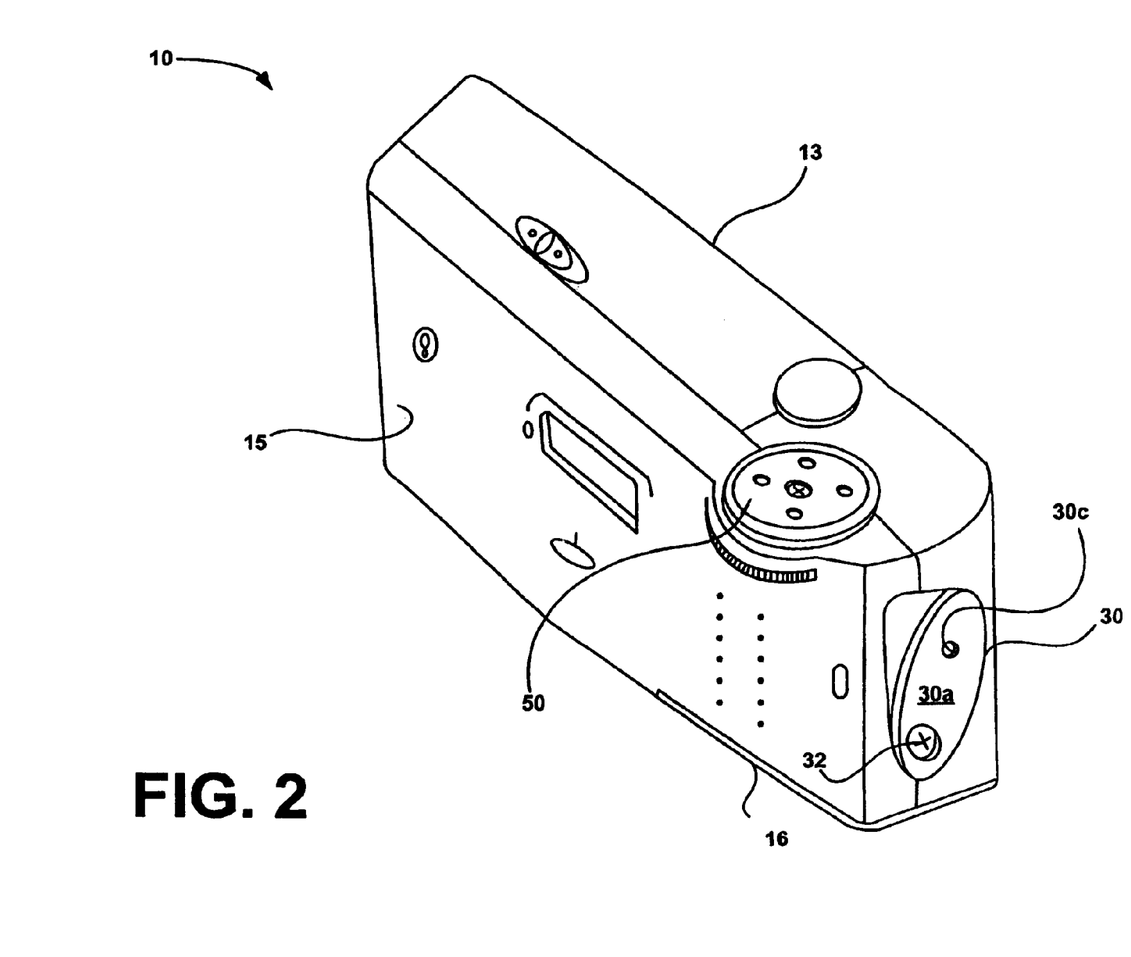
FIG. 2 is a rear perspective view of the loyalty camera of FIG. 1.
Figure 3:
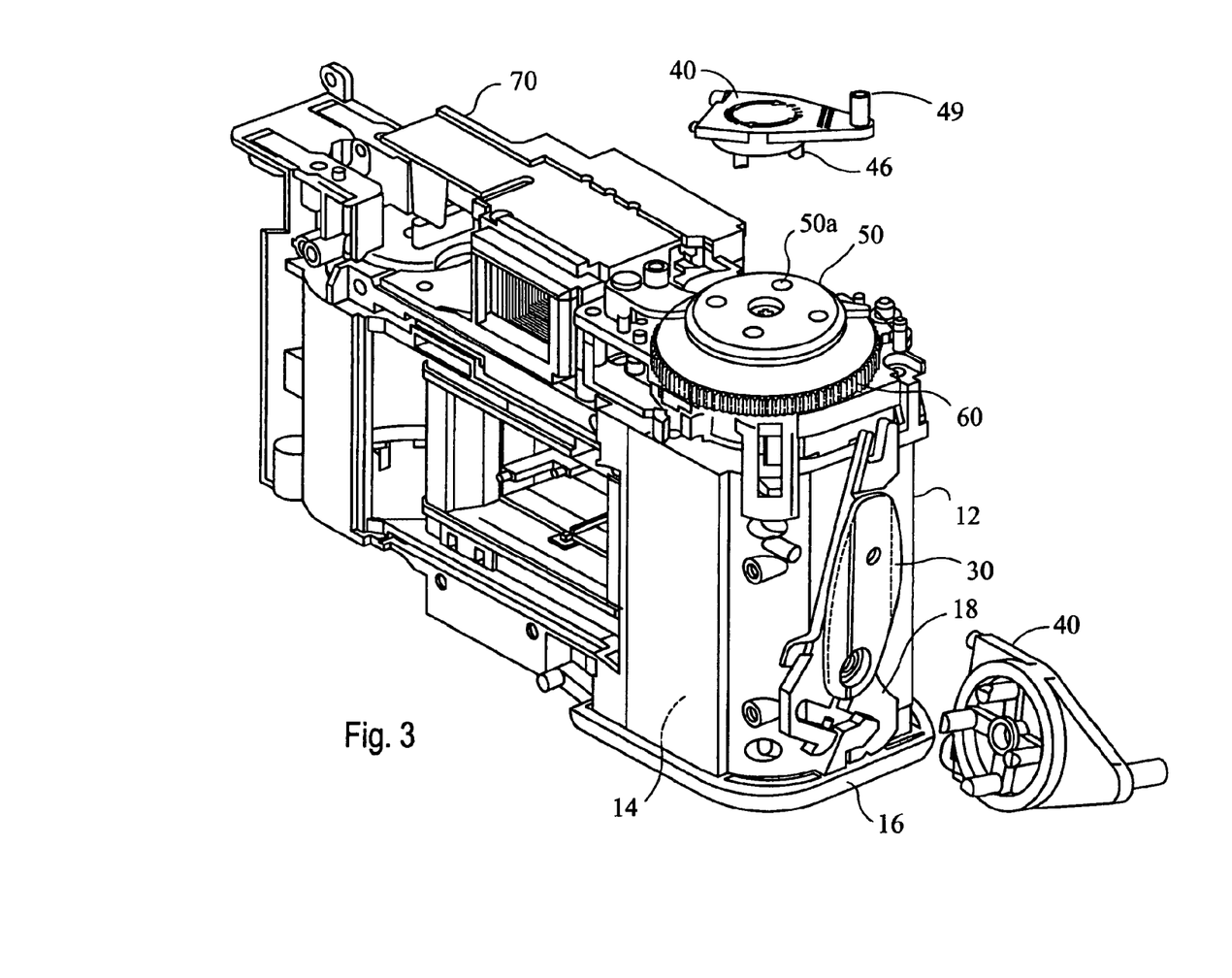
FIG. 3 is a rear perspective view of the main body of the camera of FIG. 2 having the front and rear covers removed.
Figure 9:
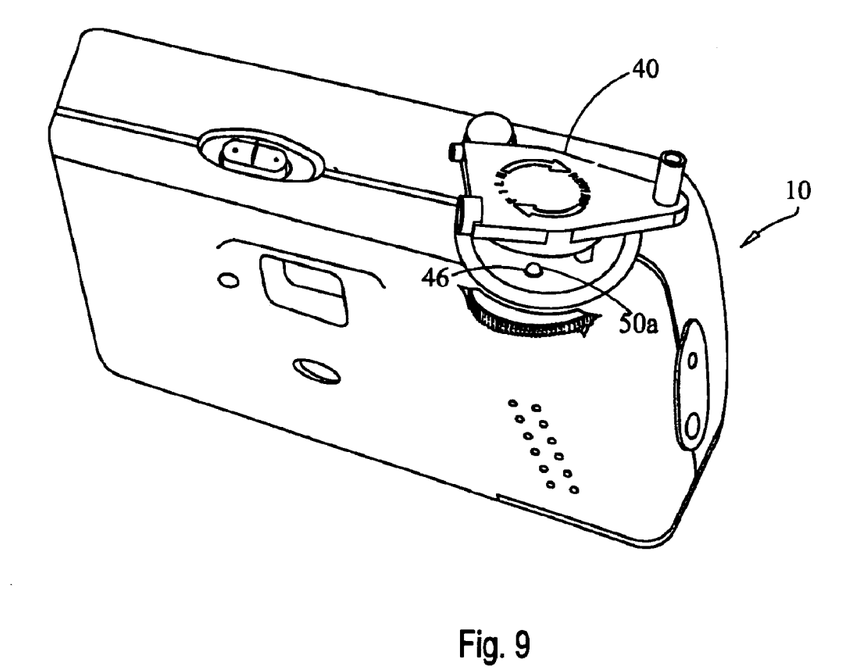
FIG. 9 is a rear partial perspective view of the camera of FIG. 1 including a tool engaged with an upper end cap of a combined film advance/rewind mechanism for rewinding the film in accordance with one embodiment of the present invention.

The prongs 46 are structured and disposed to mate with corresponding holes 50a disposed through the upper end cap 50, as shown more particularly in FIGS. 3 and 9. Upper end cap 50 sits on a generally cylindrical stem 54 connecting it to the film advance wheel 60. The holes 50a extend through the upper end cap 50 clear of the stem such that the prongs 46 may pass through the holes 50a to surround the cylindrical stem 54.

Figure 10:
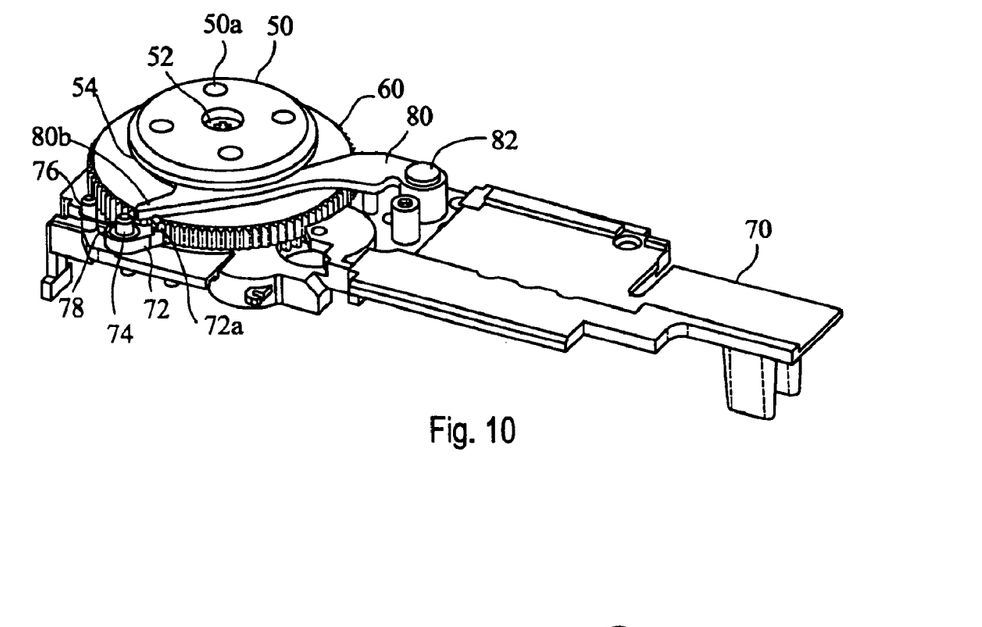
FIG. 10 is a partial perspective view of the combined film advance/rewind mechanism in accordance with one embodiment of the present invention.
Figure 11:
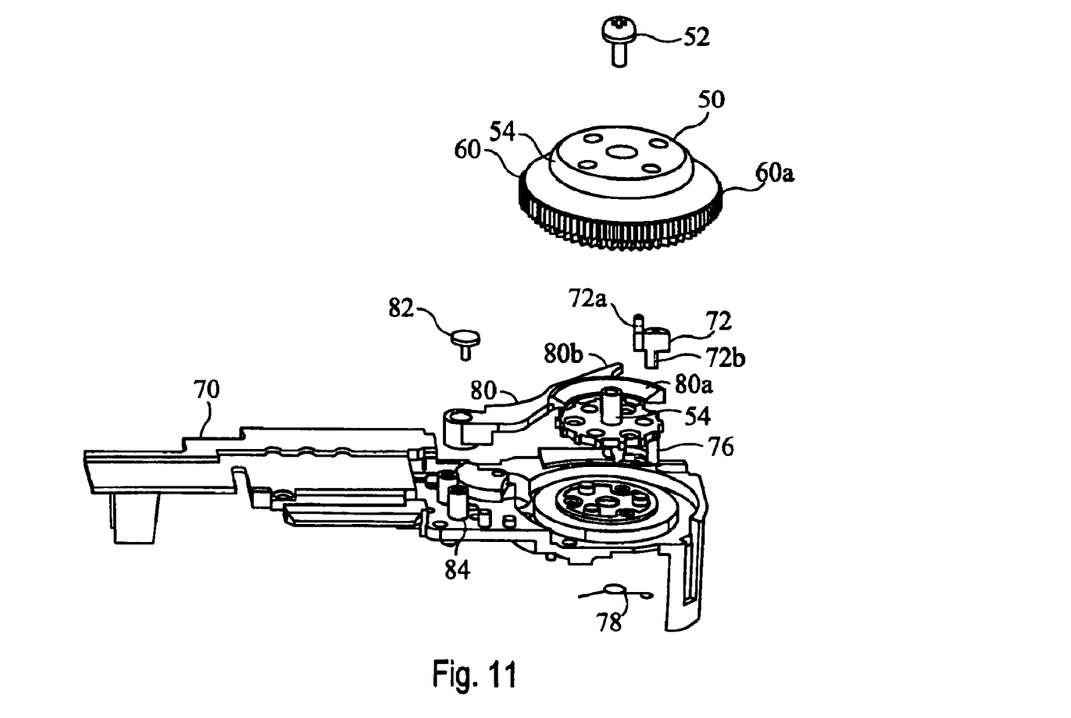
FIG. 11 is a partial exploded view of the combined film advance/rewind mechanism of FIG. 10.

Referring more particularly to FIGS. 10 and 11, upper end cap 50 is formed integrally with, or alternatively, engages, the film advance wheel 60. The film advance wheel 60 is secured to the camera body 12, through the post 54 and top plate 70 by the screw 52. The advance wheel 60 is restricted in motion to only a first direction by the preventor-ratchet or anti-reversal pawl 72, permitting the film to be advanced before each exposure as known and as described in U.S. Pat. No. 6,325,555. Anti-reversal pawl 72 sits on a post 74 formed on the top plate 70. A torsion spring 78 is biased between a post 76 formed on the top plate 70 and the back surface of the catch post 72a extending perpendicularly upward from the top surface of the anti-reversal pawl 72. The torsion spring 78 is additionally centered on the post 74 which extends from the top plate 70 up through the anti-reversal pawl 72. The torsion spring 78 maintains an edge face 72b of the anti-reversal pawl 72 in contact with the toothed gear portion 60a of the film advance wheel 60, preventing the film advance wheel 60 from being turned in a direction counter to film advancement, while the anti-reversal pawl 72 is engaged.

Additionally, a lever arm 80 is pivotally mounted to the top plate 70 via the post 84. A pin 82 secures the lever arm 80 to the top plate 70. Lever arm 80 includes a circumferential portion 80a which, when assembled, is spring biased using a spring (not shown) into contact with the cylindrical stem 54 joining the end cap 50 with the film advance wheel 60. As the film advance wheel 60 is rotated, the circumferential portion 80a follows the surface of the cylindrical stem 54. When the prongs 46 of the tool 40 pass through the holes 50a of the upper end cap 50, they surround the generally cylindrical stem. In doing so, the prongs 46 force the lever arm 80 away from and out of contact with the generally cylindrical stem 54. When so biased by the tool 40, a spur 80b of the lever arm 80 pushes the catch post 72a of the anti-reversal pawl 72, biasing the end face 72b of the anti-reversal pawl 72 away from the film advance wheel 60, permitting the film advance wheel 60 to be rotated in either direction.

As noted above, the number of prongs 46 chosen on the tool 40 is based on the design of the lever arm 80. More particularly, the length and circumferential radius of the inner circumferential surface 80a of the lever arm 80 dictates the minimum number of prongs needed on the tool 46. For example, if the circumferential portion 80a were to extend around half the circumference of cylindrical stem 54 (of FIG. 11) or greater, perhaps only two prongs 46 may be required to bias the lever arm 80 away from the stem 54 for an entire rotation of the film advance/rewind wheel 60. In this example, any fewer prongs would cause the lever arm 80 to move out of contact with the anti-reversal pawl 72 and would halt the rewinding process. In the most preferred embodiment, four prongs 46 are used to ensure that the lever arm 80 is biased away from the cylindrical stem 54 at all times during the rewinding process.

When the tool 40 is removed from the upper end cap 50, the spring (not shown) returns the lever arm 80 to its normal, spring-biased position, bringing the circumferential portion 80a back into contact with the stem 54, and taking the spur 80b out of contact with the anti-reversal pawl. Torsion spring 78 returns the anti-reversal pawl edge face 72b back into contact with the gear toothed edge 60a of the film advance wheel 60, again preventing rotation counter to film advancement. Alternatively, other types of springs may be used in place of torsion spring 78.

In the preferred embodiment, the tool 40 also includes a handle 49 extending out from its top face 47, in generally perpendicular relation thereto, to facilitate grasping and rotation of the tool 40 during film rewinding.

Figure 4:
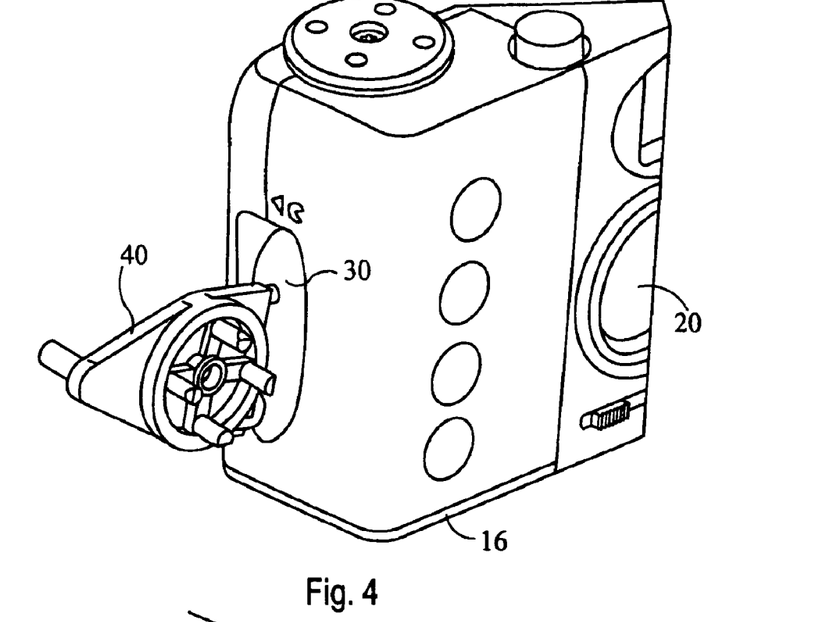
FIG. 4 is a partial front perspective view of the camera of FIG. 1 including a tool, such as the tool shown in FIG. 6, engaged with the loyalty camera door latch.
Figure 5:
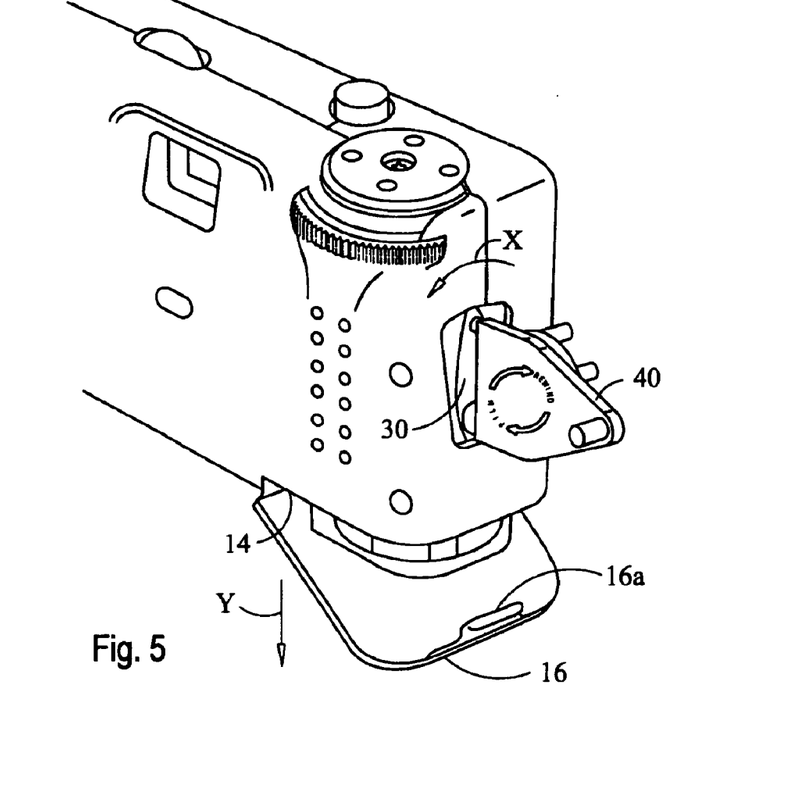
FIG. 5 is a partial rear perspective view of the camera of FIG. 1 including a tool inserted into the door latch and pivoted to open the film door.
Figure 6:
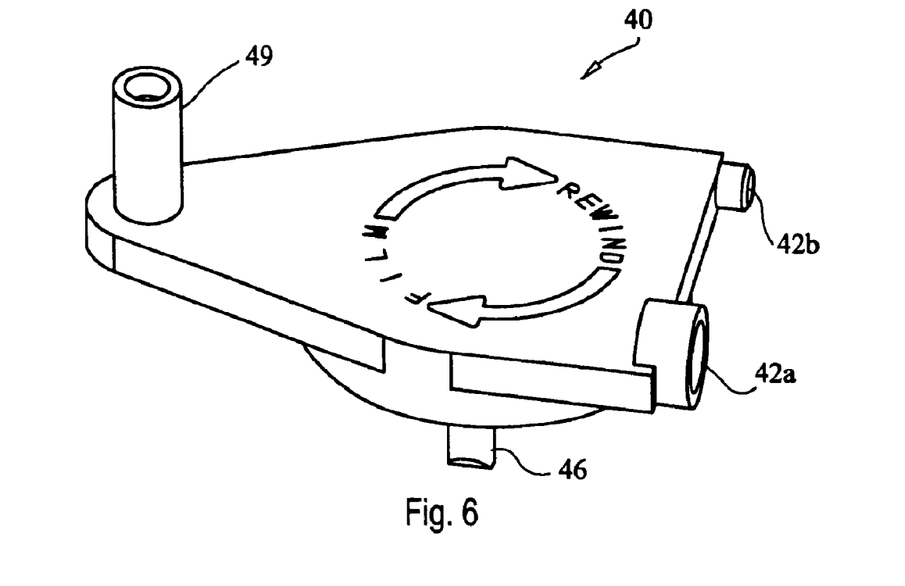
FIG. 6 is a side perspective view of a tool for use with one embodiment of the present inventions.
Figure 7:
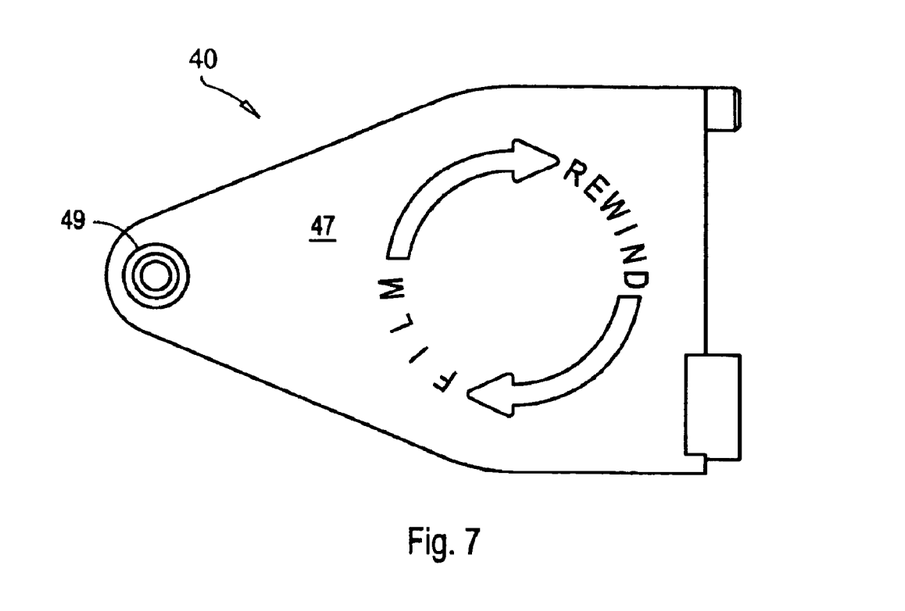
FIG. 7 is a top plan view of the tool of FIG. 6.
Figure 8:
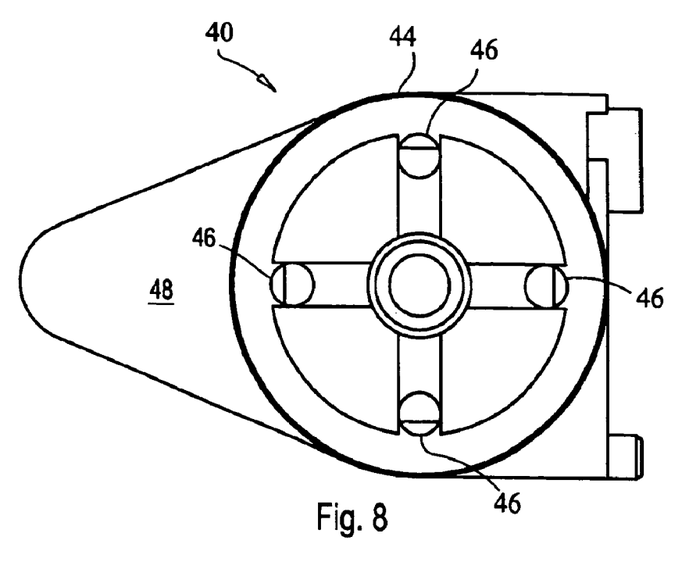
FIG. 8 is a bottom plan view of the tool of FIG. 6.

In use, unexposed film is loaded into the camera 10 of the present invention through the film door 16. Using the film advance wheel, the APS film cartridge light lock door is opened and the film thrust from the cartridge as described in the previously incorporated '082 patent. As pictures are taken, the film is further advanced onto the film spool. Once all pictures have been exposed, the camera is returned in its entirety to a participating loyalty program processing affiliate. The affiliate takes the camera from the consumer, inserts the prongs 46 of the tool 40 into the holes 50a of the end cap 50 as shown in FIG. 9. Insertion of the tool causes the prongs 46 to bias the lever arm 80 away from the stem 54, causing the spur 27b to push against the catch post 72a of the anti-reversal pawl. The affiliate grasps the tool handle 49 and rotates the tool counter to the film advance direction in order to rewind the film back into the film cartridge. Once all film is rewound into the cartridge, the light lock door is automatically closed as described in the previously incorporated '082 patent. The affiliate then inserts the pins 42a and 42b into the holes 32b and 32c of the door lever 30, respectively, as shown in FIG. 4. The tool is pivoted in the direction of arrow X, as shown in FIG. 5, in order to pivot the door lever 30 and the latching mechanism 18, which releases the hook 16a and opens the film door 16 in the direction of arrow Y. The affiliate removes the rewound film cartridge and processes the film, returning both developed prints and the original camera to the consumer. In one embodiment, the affiliate additionally returns to the consumer a new unexposed roll of film, which the consumer can slide into the film cartridge receiving chamber 14, snapping the film door 16 closed behind it. In another embodiment, the affiliate loads a new roll of unexposed film into the film cartridge receiving chamber 14, and snaps the film door 16 closed behind it. Most preferably to the loyalty program described herein, the new roll of film is provided to the consumer free of charge. The consumer is charged only for the developed prints and (if desired) the initial purchase of the camera 10.

Figure 12A:
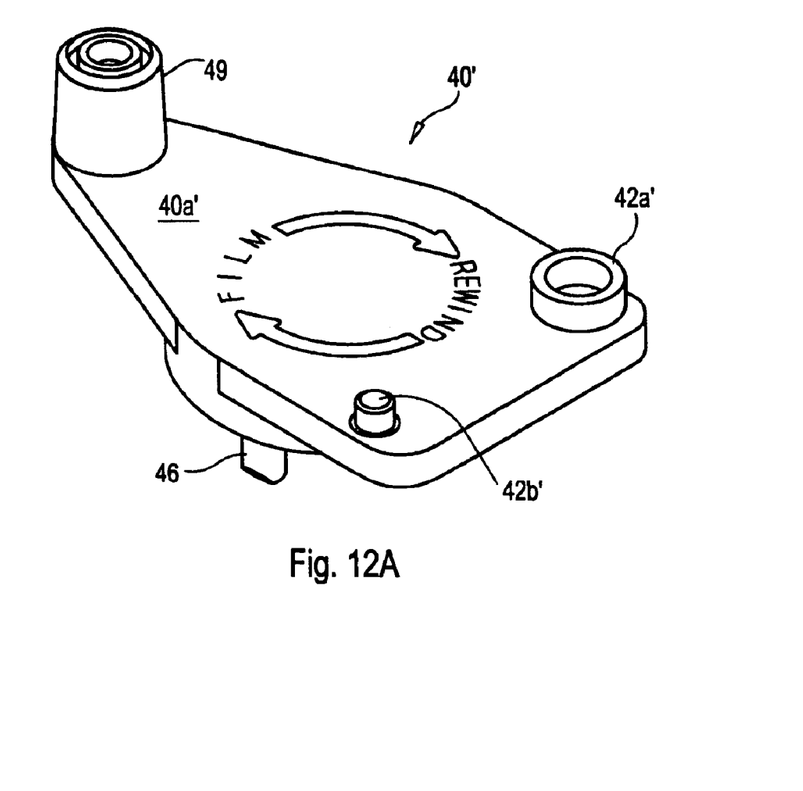
FIG. 12A is a side perspective view of an alternative embodiment of a tool for use with one embodiment of the present inventions.
Figure 12B:
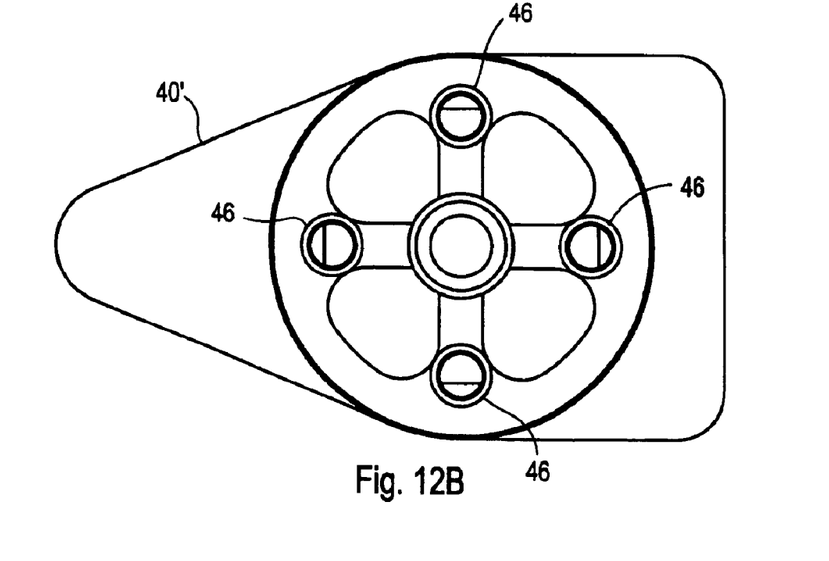
FIG. 12B is a bottom plan view of the tool of FIG. 12A.
Figure 12C:
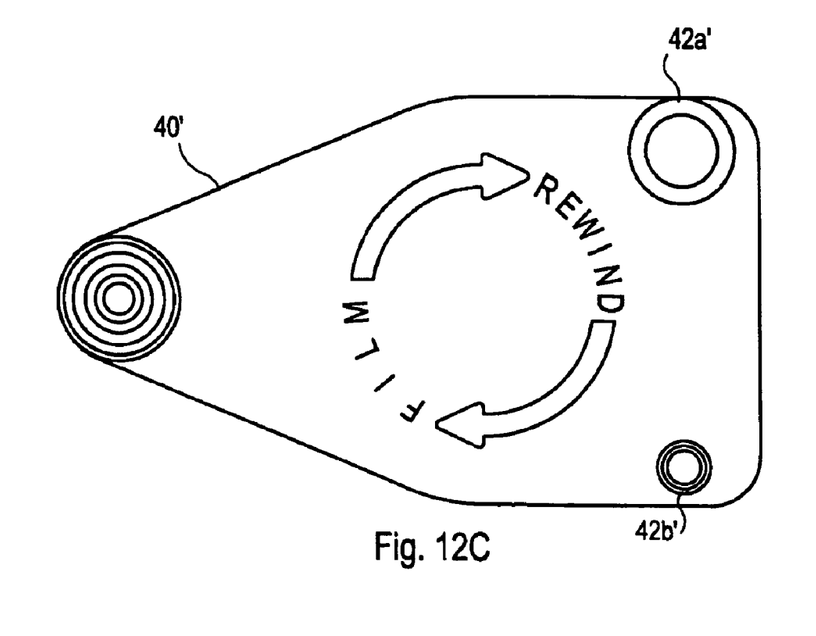
FIG. 12C is a top plan view of the tool of FIG. 12A.
Figure 13:
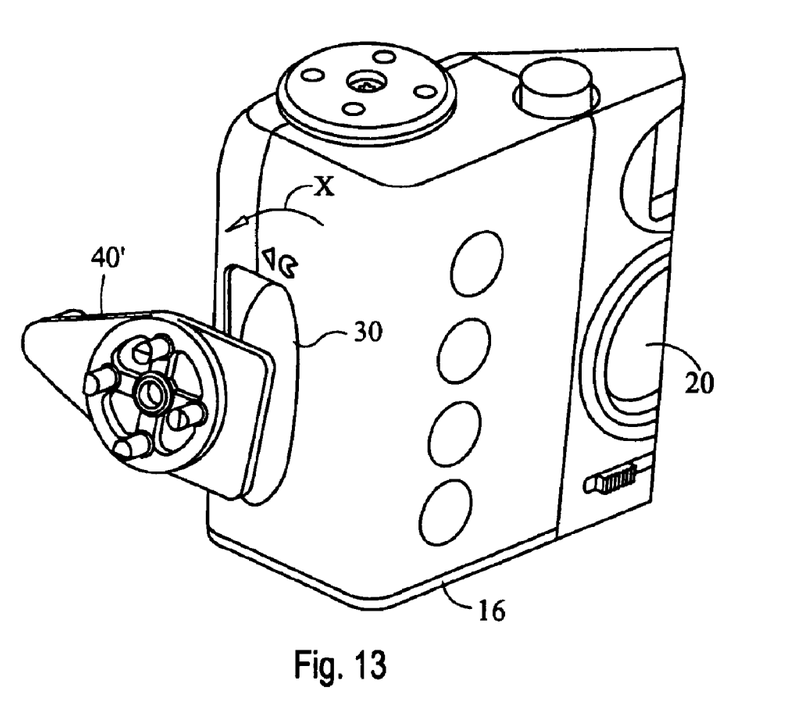
FIG. 13 is a partial front perspective view of the camera of FIG. 1 including a tool, such as shown in FIG. 12A, engaged with the loyalty camera door latch.

Referring now to FIGS. 12A–12C, there is shown another embodiment of a tool 40' useful with the loyalty camera of the present invention. The tool 40' is similar in most respects to the tool 40 with the exception that the pins 42a' and 42b' for contacting the holes 30b and 30c, respectively, in the door latch 30 are on the upper face of the tool 40' instead of at the end of the tool. In use, the tool 40' is used to open the door latch 30 as shown in FIG. 13. For example, the pins 42a' and 42b' on the upper surface 40a' of the tool 40' engage the holes 30b and 30c of the door latch 30 such that the upper surface 40a' of the tool 40' is parallel to the outer surface 30a of the door latch. The rewinding functionality of the tool 40' is identical to that described in connection with tool 40.

While the invention has been described with reference to certain embodiments, it will be understood by those skilled in the art that various changes may be made and equivalents may be substituted for elements thereof without departing from the scope of the invention. For example, the presently described restricted combined advance/rewind mechanism can be adapted for use in a system wherein the film is pre-wound in non-darkroom conditions, as is described in U.S. Pat. No. 6,325,555, that patent incorporated herein by reference, or for use with a 35 mm or other film type camera. Additionally, although the present loyalty camera is described as using a tool to operate both the rewind mechanism and the door lever, it can be seen that the present loyalty system may be implemented wherein the particular tool is used to operate only one of the rewind mechanism and the door lever, permitting the consumer to freely operate the other of the rewind mechanism and the door lever. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A loyalty camera system mechanism, comprising:
   a loyalty camera, including:
      a camera body;
      an outer casing surrounding said camera body;
      a film advance wheel rotatably attached to said camera body, said film advance wheel including a toothed gear portion and a spindle portion;
      an anti-reversal pawl mounted to said camera body, said anti reversal pawl;
      a spring in communication with said anti-reversal pawl to spring bias said anti-reversal pawl into engagement with said toothed gear portion, permitting only unidirectional rotation of said film advance wheel to advance film when said anti-reversal pawl is engaged therewith,
      a lever arm mounted to said camera body, said lever arm biased into contact with a portion of said anti reversal pawl, said lever arm being bounded on one side by a circumferential surface initially in contact with said spindle portion when said anti-reversal pawl is engaged with said toothed gear portion;

a winding tool including a film advance wheel engaging portion which engages said film advance wheel to push said lever arm out of contact with said spindle and bias said anti-reversal pawl out of engagement with said toothed gear portion, permitting rotation of said film advance wheel in both directions.

2. The loyalty camera system of claim 1, wherein said film advance wheel engaging portion engages with said spindle to increase the effective diameter of said spindle, and bias said lever arm away from the surface of said spindle.

3. The loyalty camera system of claim 2, wherein said film advance wheel further includes an end cap portion on the end of said shaft distal from said tooth engaging portion, and wherein said film wheel engaging portion passes through said end cap portion to engage with said film advance wheel.

4. The loyalty camera system of claim 3, wherein said end cap portion includes a hole therethrough, through which a portion of said film wheel engaging portion passes.

5. The loyalty camera system of claim 4, wherein said lever arm additionally includes a spur, and wherein said anti-reversal pawl additionally includes a catch post, such that said catch post is biased against said spur to maintain the circumferential surface of said lever arm against into contact with said spindle when said tool is absent, and said film wheel engaging portion when said tool is present.

6. The loyalty camera of claim 5, wherein said spring is used to bias said catch post against said spur.

7. The loyalty camera system of claim 4, wherein said film wheel engaging portion includes a prong, sized to pass through said hole.

8. The loyalty camera system of claim 7, wherein said end cap portion includes a plurality of holes and said film wheel engaging portion includes a plurality of prongs sized to pass through said plurality of holes, said prongs being arranged on said tool to align with said holes, such that said prongs pass through said holes to surround said shaft and push the circumferential surface of said lever arm away from the surface of said shaft.

9. The loyalty camera system of claim 8, wherein said tool is additionally used to rewind the film after exposures have been made.

10. The loyalty camera system of claim 9, wherein said winding tool includes four prongs and said end cap includes four holes.

11. The loyalty camera system of claim 8, wherein said outer casing includes a film door and a film door lever rotatable to open said film door.

12. The loyalty camera system of claim 11, wherein said film door lever is not rotatable without using an externally applied tool.

13. The loyalty camera system of claim 12, wherein said winding tool is used to open said film door lever.

14. The loyalty camera system of claim 13, wherein said winding tool includes prongs sized to engage holes in said film door lever.

15. The loyalty camera system of claim 14, wherein said prongs are different from said plurality of prongs.

16. A winding tool for use with a loyalty camera in a camera loyalty system, comprising:
an upper surface;
a lower surface;
a circumferential edge, perpendicular to and bounded between said upper surface and said lower surface;
a plurality of individual, freestanding winding prongs extending perpendicular from said lower surface and arranged to engage a corresponding plurality of individual mating holes in the loyalty camera;
a winding handle extending perpendicular from said upper surface;
a key portion extending from said winding tool to engage a film door lever of the loyalty camera.

17. The winding tool of claim 16, wherein said key portion comprises a key prong.

18. The winding tool of claim 17, wherein said key portion comprises a plurality of key prongs.

19. The winding tool of claim 18, wherein said plurality of key prongs extend from the circumferential edge of said winding tool.

20. The winding tool of claim 18, wherein said plurality of key prongs extend from one of said surfaces of said winding tool.

21. The winding tool of claim 20, wherein said plurality of key prongs extend from said upper surface.

22. A method of using a loyalty camera system, comprising the steps of:
providing a loyalty camera to a consumer, wherein said loyalty camera comprises:
a camera body;
an outer casing surrounding said camera body;
a film advance wheel rotatably attached to said camera body, said film advance wheel including a toothed gear portion and a spindle portion;
an anti-reversal pawl mounted to said camera body, said anti reversal pawl;
a spring in communication with said anti-reversal pawl to spring bias said anti-reversal pawl into engagement with said toothed gear portion, permitting only unidirectional rotation of said film advance wheel to advance film when said anti-reversal pawl is engaged therewith,
a lever arm mounted to said camera body, said lever arm biased into contact with a portion of said anti reversal pawl, said lever arm being bounded on one side by a circumferential surface initially in contact with said spindle portion when said anti-reversal pawl is engaged with said toothed gear portion; and
providing a winding tool to a non-consumer affiliate of the loyalty camera system; said winding tool including a film advance wheel engaging portion which engages said film advance wheel to push said lever arm out of contact with said spindle and bias said anti-reversal pawl out of engagement with said toothed gear portion, permitting rotation of said film advance wheel in both directions;
winding the film with said winding tool, wherein said winding step is performed by said non-consumer affiliate;
replacing a new canister of film into said loyalty camera on behalf of said consumer, wherein said replacing step is performed by said non-consumer affiliate; and
returning said loyalty camera to said consumer after said replacing step.

23. The method of claim 22, wherein said new canister of film is provided with no charge to the consumer.

24. The method of claim 22, wherein said outer casing includes a film door and a film door lever securing said film door closed, and wherein said method further includes the step rotating said film door lever with said winding tool to open said film door after said rewinding step but prior to said replacing step, wherein said rotating step is performed after said winding step and prior to said replacing step.

25. The method of claim 22, wherein said winding step is performed after the consumer has exposed the film and taken said camera to said affiliate.

26. The method of claim 22, wherein said winding step occurs after said replacing step and prior to said returning step, in order to pre-wind the film.

* * * * *